March 24, 1931.  F. W. LEE  1,797,268
ELECTRICAL TRANSLATING APPARATUS
Original Filed Oct. 30, 1926
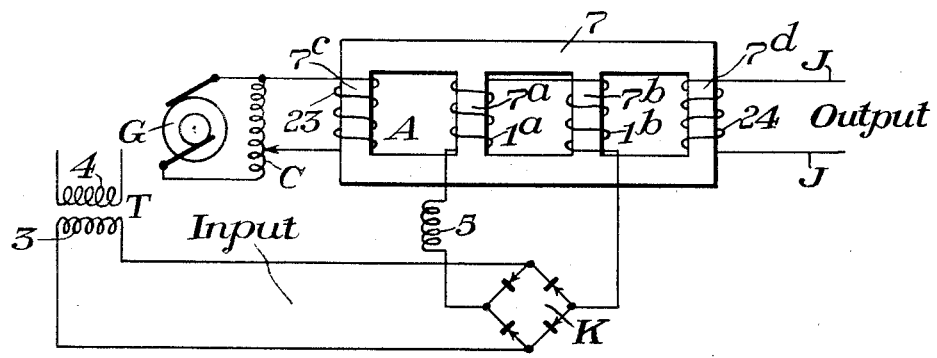
INVENTOR:
F. W. Lee,
by A. R. Vermull,
His attorney.

Patented Mar. 24, 1931

1,797,268

UNITED STATES PATENT OFFICE

FREDERICK W. LEE, OF WASHINGTON, DISTRICT OF COLUMBIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Application filed October 30, 1926, Serial No. 145,265. Renewed July 15, 1930.

My invention relates to electrical translating apparatus, and particularly to apparatus of the type comprising an input circuit which is at times supplied with current, and an output circuit in which the flow of current is controlled in accordance with the current supplied to the input circuit.

I will describe one form of translating apparatus embodying my invention, and will then point out the novel features thereof in the claim.

The accompanying drawing is a diagrammatic view illustrating one form of translating apparatus embodying my invention.

Referring to the drawing, the reference character A designates a reactor having a ladder shaped magnetizable core 7 provided with two outer cross bars $7^c$ and $7^d$, and two inner cross bars $7^a$ and $7^b$. The outer cross bar $7^c$ is provided with a winding 23, and alternating current is supplied to this winding from a source which is here shown as an auto transformer C having its primary terminals connected with an alternator G.

The cross bar $7^a$ carries a coil $1^a$ and the cross bar $7^b$ carries a similar coil $1^b$, the coils $1^a$ and $1^b$ being connected in series to constitute an input winding. This winding is at times supplied with current from an input circuit which may, in turn, be supplied with energy in any suitable manner. In the form here shown, alternating current is supplied to the input circuit from a secondary 3 of a transformer T, the primary 4 of which is supplied with alternating current from a suitable source not shown in the drawing. A rectifier K of any suitable type is interposed between the input circuit and the winding $1^a$, $1^b$ so that unidirectional current is supplied to the winding. An impedance 5 is interposed between the rectifier K and the winding $1^a$, $1^b$ to limit the alternating component of the current supplied to this winding from the rectifier.

The outer cross bar $7^d$ carries an output winding 24 connected with output conductors J.

The alternating magnetic flux created in core 7 by the alternating current in winding 23 flows through three parallel magnetic paths, namely, the paths comprising the cross bars $7^a$, $7^b$ and $7^d$, respectively. The parts are so proportioned that for small values of input energy a comparatively large proportion of the alternating flux supplied by winding 23 flows through the cross bars $7^a$ and $7^b$. Under these conditions, the voltage induced in winding 24 is comparatively small and the output current is correspondingly small. For comparatively large values of the input energy, however, the increased magnitude of the unidirectional flux created in the cross bars $7^a$ and $7^b$ increases the effective reluctance of these bars to the alternating flux supplied by winding 23, and an increased proportion of the alternating flux links winding 24 and induces in that winding a correspondingly large voltage. It follows that for small values of input energy the output current is small, but that with large values of input energy the variation in magnetic coupling between windings 23 and 24 produces a larger output current. The actual variation in the output current may be many times the variation in the input energy, the actual value of the output energy being dependent upon the design and proportions of the various parts.

The reason for the two inner cross bars $7^a$ and $7^b$ and for the input winding divided between these cross bars, is to limit the amount of "feed back", that is, the amount of alternating current induced in the input winding by the alternating flux created by winding 23. The voltage induced in coil $1^a$ by the alternating flux in core 7, annuls the effect of the voltage induced in coil $1^b$ by this alternating flux, and as a result no undesirable current is fed back into the input circuit.

Apparatus embodying my invention is particularly suitable for use in automatic train control systems of the continuous inductive type. In systems of this character, the secondary 3 of the transformer T, which supplies the input circuit, would ordinarily be carried on the locomotive, and the track rails would ordinarily constitute the primary 4 of this transformer. The output circuit J may supply current to an electro-responsive device of any suitable type, or may feed into the input circuit of a second stage of translating apparatus similar to that shown in the drawing.

Although I have herein shown and described only one form of electrical translating apparatus embodying my invention, it is understood that various changes and modifications may be made therein within the scope of the appended claim without departing from the spirit and scope of my invention.

Having thus described my invention, what I claim is:

In combination, a ladder shaped magnetizable core having two outer cross bars and two inner cross bars, a first winding on one outer cross bar supplied with alternating current, a second winding on the other outer cross bar for supplying current to an output circuit, and a third winding comprising two coils located on the two inner bars respectively and connected in series opposition with a source of unidirectional current.

In testimony whereof I affix my signature.

FREDERICK W. LEE.